(12) United States Patent
Lee et al.

(10) Patent No.: US 6,323,702 B1
(45) Date of Patent: Nov. 27, 2001

(54) INTEGRATED CIRCUIT DEVICES HAVING CIRCUITS THEREIN FOR DRIVING LARGE SIGNAL LINE LOADS

(75) Inventors: Kyu-chan Lee, Seoul; Nam-jong Kim, Kyungki-do, both of (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/547,583

(22) Filed: Apr. 12, 2000

Related U.S. Application Data

(63) Continuation of application No. 08/885,796, filed on Jun. 30, 1997, now abandoned.

(30) Foreign Application Priority Data

Oct. 9, 1996 (KR) .................................................. 96-44931

(51) Int. Cl.[7] .................................................. H03K 5/13
(52) U.S. Cl. ............................. 327/111; 327/382; 326/21
(58) Field of Search .................................. 327/382, 292, 327/293, 294, 295, 299, 108, 111; 326/17, 21, 22, 23, 26, 27, 29, 86

(56) References Cited

U.S. PATENT DOCUMENTS

| | | | |
|---|---|---|---|
| 4,727,266 | * | 2/1988 | Fujii et al. ............................... 326/27 |
| 4,785,203 | * | 11/1988 | Nakamura ............................... 327/87 |
| 5,034,629 | * | 7/1991 | Kinugasa et al. ....................... 326/27 |
| 5,576,634 | | 11/1996 | Kamiya ................................... 326/82 |
| 5,672,983 | * | 9/1997 | Yamamoto et al. .................... 326/27 |
| 5,801,550 | | 9/1998 | Tanaka et al. .......................... 326/87 |

FOREIGN PATENT DOCUMENTS

| | | | |
|---|---|---|---|
| 2-109421 | 4/1990 | (JP) | ......................................... 326/26 |
| 1-84916 | 3/1989 | (JP) | ......................................... 326/27 |
| 4-120817 | 4/1992 | (JP) | ......................................... 326/27 |

* cited by examiner

*Primary Examiner*—Tuan T. Lam
(74) *Attorney, Agent, or Firm*—Myers Bigel Sibley & Sajovec

(57) ABSTRACT

A signal line drive circuit for a semiconductor device includes a first driver having an input for receiving an input signal and an output, a second driver having an input connected to the output of the first driver and an output connected to a signal line, and a third driver having an input connected to the output of the first driver and an output connected to a point of the signal line. The point of the signal line is spaced from the output of the second driver such that a first load is present between the output of the second driver and the point of the signal line, and such that a second load is present between the point of the signal line and an output of the signal line. The first, second and third drivers each include at least one inverting buffer. The drive circuit reduces a delay time of a signal transmitted through the signal line, and improves the voltage-time slope of the transmitted signal.

4 Claims, 1 Drawing Sheet

INTEGRATED CIRCUIT DEVICES HAVING CIRCUITS THEREIN FOR DRIVING LARGE SIGNAL LINE LOADS

REFERENCE TO PRIORITY APPLICATION

This application is a continuation of U.S. application Ser. No. 08/885,796, filed Jun. 30, 1997, now abandoned.

BACKGROUND OF THE INVENTION

1. Field of the Invention

The present invention relates to a semiconductor device, and more particularly, to a signal line drive circuit of a semiconductor device.

2. Description of the Related Art

As the degree of integration of semiconductor devices increases, the size of the various devices making up the internal structure of device chips decreases. This increase in integration is thus accompanied by a lengthening of the signal lines through which signals are transmitted (i.e., input and output lines and data lines), which in turn increases the load of the signal lines. It has therefore become important to reduce any delay time generated in the signal lines due to the relatively large load by speeding up the signal line drive function to obtain a high speed operation of the semiconductor device. In other words, the transmission characteristics of the signal line connecting the circuits should be improved to allow for a high speed operation.

FIG. 1 is a circuit diagram of a conventional drive circuit for driving a signal line having a large load.

Referring to FIG. 1, a driver 1 includes one set of series connected inverting buffers I1 and I2 and drives a signal line having a large load connected to an output port thereof, namely, loads 3 and 5. Here, the size of the inverting buffer I2 is appropriately designed for driving the signal line having the large loads 3 and 5. When an output signal of the driver 1 is transmitted through the signal line, the delay time generated by the loads 3 and 5 of the signal line is determined by multiplying together the resistance R and the capacitance C of the load. Therefore, since the signal line is physically long in a highly integrated device and thus the resistance R and the capacitance C of the signal line are relatively large, the conventional drive circuit of FIG. 1 suffers a drawback in that the delay time of the signal transmitted through the signal line increases and the slope of the V-time curve (defined by the rise in voltage with respect to time) becomes flatter.

FIG. 2 is a circuit diagram of another conventional drive circuit for driving a high-load signal line.

The circuit of FIG. 2 includes a second driver 9 located near the physical center (N) of the signal line between loads 3 and 5. Namely, the first driver 7 drives the load 3 and the second driver 9 drives the load 5. The first driver 7 is comprised of series connected inverting buffers I3 and I4, and the second driver 9 is comprised of series connected inverting buffers I5 and I6. The conventional drive circuit of FIG. 2 has an advantage in that the slope of the V-time curve of the signal transmitted through the signal line is steepened, but nevertheless suffers a disadvantage in that there is a time lapse cause by buffering that takes place in the second driver 9.

FIG. 4 shows simulated results of the conventional signal line drive circuits of FIGS. 1 and 2, and the signal line drive circuit according to the present invention of FIG. 3 which will be described later. Here, IN denotes an input signal and OUT1, OUT2, and OUT3 denote the output signals of the drive circuits of FIGS. 1, 2, and 3, respectively. FIG. 4 illustrates the results of performing a simulation in the drive circuits of FIGS. 1, 2, and 3 using loads and drivers of the same size. That is, the simulation results were obtained under the following conditions: the size of the inverting buffer 12 of FIG. 1 was equal to the sum of the inverting buffers I4 and I6 of FIG. 2 and the sum of the inverting buffers I8 and I9 of FIG. 3; the widths of a PMOS transistor and an NMOS transistor were 300 $\mu$m and 150 $\mu$m, respectively; the resistance of the combined load (the load 3+the load 5) of the signal line was 800$\Omega$; the load capacitance was 4 pF; and the power supply voltage $V_{cc}$ was 2V.

As shown in the simulated results of FIG. 4, the output signal OUT2 of the drive circuit of FIG. 2 reaches $V_{cc}/2$ (about 1V) faster than the output signal OUT1 of the drive circuit of FIG. 1 by a time difference $\Delta$1. However, the output signal OUT1 of the drive circuit of FIG. 1 reaches a voltage in the RO voltage region faster than the output signal OUT2 of the drive circuit of FIG. 2, i.e., the voltage region in which the voltage level of the output signals is lower than $V_{cc}/2$. This is due to the the buffering time in the second driver 9 of FIG. 2 which causes the enable starting point S2 of the output signal OUT2 to be delayed by t1 compared to the enable starting point S1 of the output signal OUT1.

In the conventional signal line drive circuits of FIGS. 1 and 2, when a signal is transmitted through the high-load signal line at,a high speed, an erroneous operation can result since the high load is accompanied by an increase in the delay time of the signal transmitted through the signal line and a flattening of the slope of the V-time curve.

SUMMARY OF THE INVENTION

It is an object of the present invention to provide a signal line drive circuit of a semiconductor device which reduces the delay time of a signal transmitted through a high-load signal line and increases the slope of the V-time curve of the transmitted signal.

To achieve the above object, a signal line drive circuit for a semiconductor device includes a first driver having an input for receiving an input signal and an output, a second driver having an input connected to the output of the first driver and an output connected to a signal line, and a third driver having an input connected to the output of the first driver and an output connected to a point of the signal line. The point of the signal line is spaced from the output of the second driver such that a first load is present between the output of the second driver and the point of the signal line, and such that a second load is present between the point of the signal line and an output of the signal line.

The first, second and third drivers may each include at least one inverting buffer, and in some cases, at least one of the first, second and third drivers may include two or more inverting buffers connected in series. Also, preferably the first driver and said second driver are located in close proximity to each other, and the point of the signal line is centrally located between an input and an output of the signal line.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE PREFERRED EMBODIMENTS

Hereinafter, a preferred embodiment of the present invention will be described with reference to attached drawings.

Figure 3:
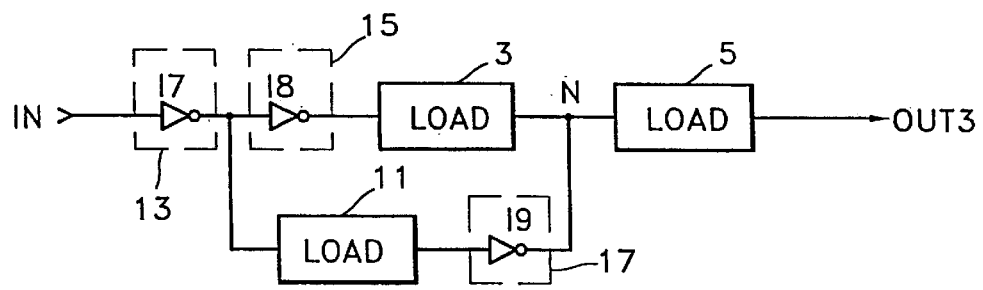
FIG. 3 is a circuit diagram of a drive circuit according to an embodiment of the present invention for driving a signal line having a large load.

FIG. 3 is a circuit diagram of a drive circuit according to an embodiment of the present invention. The drive circuit includes a first driver 13, a second driver 15 for driving a high-load signal line, namely, loads 3 and 5, and a third driver 17 which receives an output signal of the first driver 13 to rapidly drive the signal line and whose output port is connected to a node N between loads 3 and 5 of the signal line. Here, the first, second, and third drivers 13, 15 and 17 are comprised of inverting buffers I7, I8 and I9, respectively, and can include two or more inverting buffers connected in series as needed.

The first driver 13 and the second driver 15 are preferably adjacent to each other in the chip layout, and the output of the third driver 17 is preferably connected to a node between the loads 3 and 5 and at a central position of the signal line in the chip layout. Load 11 is the load of a signal line which is connected between the output port of the first driver 13 and the input port of the third driver 17.

In the signal line drive circuit according to the present invention, a signal drive path is divided into a first path through the second driver 15 and a second path through the third driver 17. In the example here, the signal drive path is divided into two paths, but it can be divided into more than two paths if needed.

Figure 1:
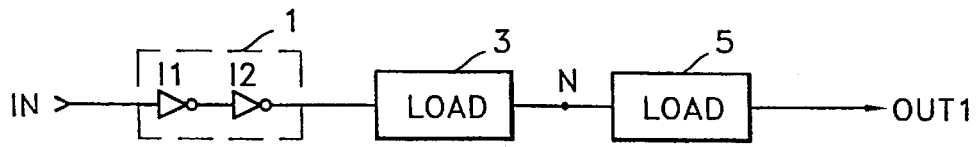
FIG. 1 is a circuit diagram of a conventional drive circuit for driving a signal line having a large load.

The drive path through the second driver 15 is for obtaining a drive starting point identical to that of the drive circuit of FIG. 1. On the other hand, the drive path through the third driver 17 is for improving the slope of the V-time curve of the signal OUT3 transmitted to the final output port. The load 11 is preferably smaller than the load 3. Accordingly, by diverting some of the drive signal through the third driver 17 so as to arrive earlier than that through the drive path of the second driver 15, it is possible to drive the load 3 from both directions and to drive the load 5 more quickly than in the circuit of FIG. 1

Figure 2:
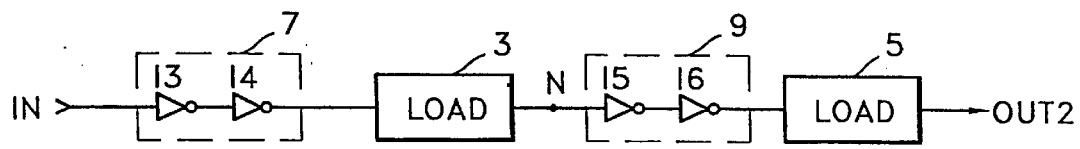
FIG. 2 is a circuit diagram of another conventional drive circuit for driving a signal line having a large load.
Figure 4:
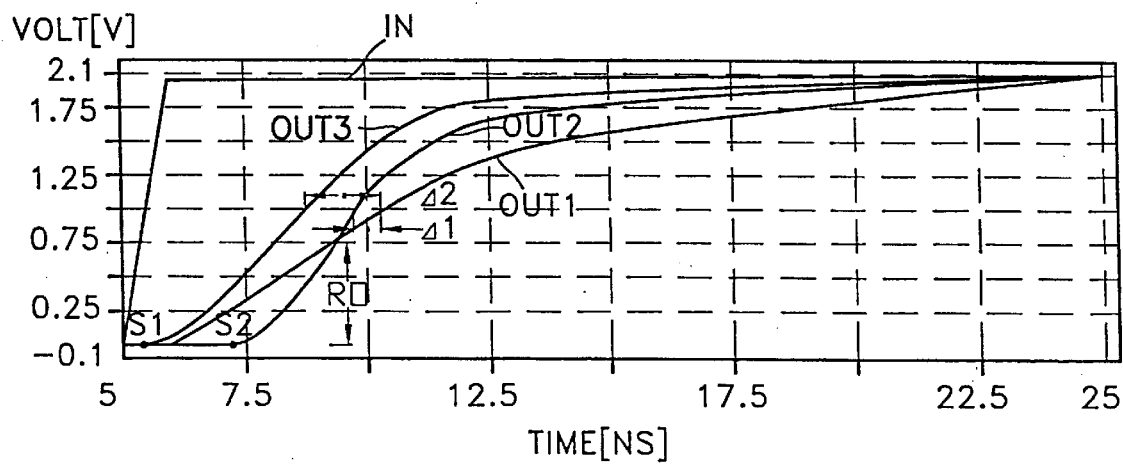
FIG. 4 shows simulated operational results of the conventional signal line drive circuits of FIGS. 1 and 2 and the signal line drive circuit according to the present invention of FIG. 3.

Therefore, when the signal line drive circuit according to the present invention of FIG. 3 is used, as shown in the simulated results of FIG. 4, the output signal OUT3 of the driving circuit of FIG. 3 reaches $V_{cc}/2$ faster than the output signal OUT1 of the drive circuit of FIG. 1 by a time difference Δ2. Also, the output signal OUT3 of the drive circuit of FIG. 3 reaches voltages in the RO region faster than the conventional drive circuits of FIGS. 1 and 2, and the slope of the V-time curve is more preferable as well.

As will be apparent to those skilled in the art, various modifications and variations can be made in the apparatus and method described above without departing from the spirit or scope of the invention. Thus, it is intended that the present invention cover the modifications and variations of this invention that come within the scope of the appended claims and their equivalents.

What is claimed is:

1. A signal line drive circuit, comprising:

a primary signal line that extends continuously from a first end to a second end thereof and provides a first series resistive path between the first and second ends that is not interrupted by an active electronic device;

a first driver having a first input and a first output, the first input receiving an input signal;

a second driver having a second input connected to the first output of said first driver and a second output connected to the first end of said primary signal line;

a third driver having a third input and a third output, the third output being connected to said primary signal line at an intermediate point between the first and second ends; and a secondary signal line that extends from the first output of said first driver to the third input of said third driver and provides a second series resistive path therebetween that is not interrupted by an active electronic device; and wherein a total RC delay time constant associated with said secondary signal line is smaller than a total RC delay time constant associated with a first portion of said primary signal line that extends from the first end to the intermediate point;

wherein the second input of said second driver is electrically connected to the first output of said first driver by said secondary signal line;

wherein said second driver and said third driver each have one inverter therein or have an equal number of inverters therein; and wherein a pull-up signal provided by said third driver arrives earlier at the intermediate point than a pull-up signal provided by said second driver during a pull-up time interval when said primary signal line is being driven from a logic 0 potential to a logic 1 potential by both said second and third drivers.

2. The signal line drive circuit as claimed in claim 1, wherein the total RC delay time constant associated with the first portion of said primary signal line is about equal to a total RC delay time constant associated with a second portion of said primary signal line that extends from the intermediate point to the second end thereof.

3. The signal line drive circuit of claim 2, wherein a sum of the total RC delay time constant associated with the first portion of said primary signal line and the total RC delay time constant associated with the second portion of said primary signal line is greater than about 3.2 ns.

4. The signal line drive circuit of claim 3, wherein a drive capability of said third driver equals a drive capability of said second driver.

* * * * *